United States Patent [19]

Vucins

[11] 4,302,072
[45] Nov. 24, 1981

[54] DEVICE FOR TAPPING SCATTERED LIGHT FROM A JOINT IN AN ADJUSTABLE CONNECTOR FOR TWO OPTICAL FIBRE WAVEGUIDES

[75] Inventor: Viesturs J. Vucins, Tyresö, Sweden

[73] Assignee: Telefonaktiebolaget L M Ericsson, Stockholm, Sweden

[21] Appl. No.: 77,789

[22] Filed: Sep. 21, 1979

Related U.S. Application Data

[63] Continuation of Ser. No. 877,128, Feb. 13, 1978, abandoned.

[30] Foreign Application Priority Data

Feb. 25, 1977 [SE] Sweden ............................... 7702118

[51] Int. Cl.³ .............................................. G02B 7/26
[52] U.S. Cl. ........................... 350/96.21; 350/96.15; 350/96.16
[58] Field of Search ............... 350/96.10, 96.15, 96.16, 350/96.17, 96.18, 96.20, 96.21, 96.22

[56] References Cited

U.S. PATENT DOCUMENTS

| 3,918,794 | 11/1974 | Milton | 350/96.16 |
| 3,943,358 | 3/1976 | Reymond et al. | 350/96.10 X |
| 4,019,806 | 4/1977 | Fellows et al. | 350/96.21 |
| 4,021,099 | 5/1977 | Kawasaki et al. | 350/96.21 |
| 4,080,044 | 3/1978 | Gousseau | 350/96.21 |
| 4,092,061 | 5/1978 | Stigliani, Jr. | 350/96.15 |
| 4,124,272 | 11/1978 | Henderson et al. | 350/96.21 |
| 4,146,300 | 3/1979 | Kaiser | 350/96.21 |

FOREIGN PATENT DOCUMENTS 2295436 12/1974 France .
2328973 5/1977 France ............................... 350/96.15

OTHER PUBLICATIONS

Guttmann et al., "A Simple Connector for Glass Fibre Optical Waveguides", *A. E. U.*, vol. 29, No. 1, Jan. 1975, pp. 50-52.

*Primary Examiner*—John D. Lee
*Attorney, Agent, or Firm*—Hane, Roberts, Spiecens & Cohen

[57] ABSTRACT

A device for tapping scattered light from a joint in an adjustable connector for two optical fibre waveguides having a first and a second cylindrical jointing tube for the fibre waveguides and a jointing sleeve for the jointing tube, at least one of the fibre waveguides being, inside its jointing tube, enclosed by a capillary tube of a transparent material.

8 Claims, 1 Drawing Figure

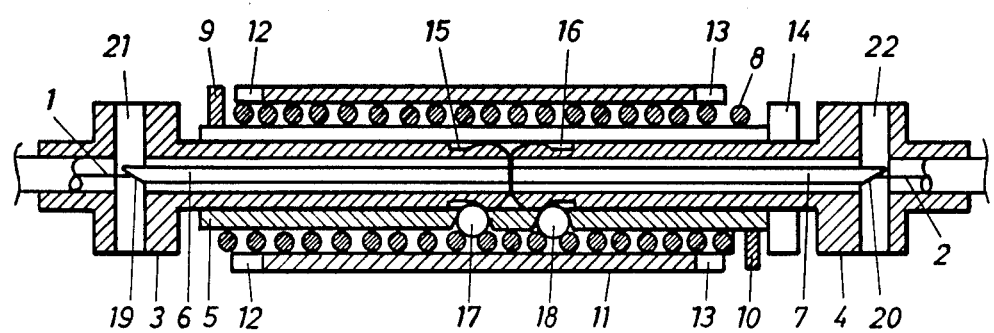

DEVICE FOR TAPPING SCATTERED LIGHT FROM A JOINT IN AN ADJUSTABLE CONNECTOR FOR TWO OPTICAL FIBRE WAVEGUIDES

This is a continuation application of application Ser. No. 877,128 filed Feb. 13, 1978, now abandoned.

BACKGROUND OF THE INVENTION

The invention relates to a device for tapping scattered light from a joint in an adjustable connector for two optical fibre waveguides.

An adjustable connector of the above-mentioned type is described more in detail in AEU 29, 1975, pages 50–52, "A Simple Connector for Glass Fibre Optical Waveguides". The optical fibre waveguides in the publication are located eccentrically inside their respective jointing tubes and the jointing sleeve has a V-shaped through channel with a first and a second division displaced radially relative to each other and arranged for receiving the first and the second jointing tubes so that the coupling factor of the connector can be adjusted to a maximum through a mutual rotary movement of the jointing tubes.

The device according to the invention achieves a tapping of scattered light from the joint of the connector. A particular application consists of tapping a slight amount of scattered light to produce a feedback signal for level stabilization of an optical transmitter. Another method of utilizing the device of the invention consists in adjusting by means of a measuring instrument the tapping of scattered light to a minimum corresponding to a carefully adjusted maximum of the coupling factor of the connector. Further ways of using the invention are possible, for instance for providing adjustable taps along an optical distribution line.

DESCRIPTION OF THE DRAWING

The device according to the invention the characteristics of which appear from the appended claims will now be described more in detail with reference made to the accompanying drawing which shows a sectional view of an optical connector according to the preferred embodiment of the invention.

DESCRIPTION OF THE PREFERRED EMBODIMENT

The drawing shows a sectional view of an adjustable connector for two optical fibre waveguides 1 and 2. The connector comprises a first and a second cylindrical jointing tube 3 and 4 for the fibre waveguides and a jointing sleeve 5 for the jointing tubes. Inside their respective jointing tubes, the fibre waveguides are surrounded by a respective glass capillary tube 6 and 7 which according to the example have a smaller outside diameter than the inside diameter of the jointing tubes so that they can be fixed by glue in an eccentric position. In this way the optical fibre waveguides 1 and 2 are eccentrically located inside their respective jointing tubes 3 and 4.

The jointing sleeve 5 has a V-shaped through channel with a first and a second division displaced radially relative to each other and arranged for receiving the jointing tubes 3 and 4 so that the optical coupling factor of the connector can be adjusted to a maximum through a mutual rotary movement of the jointing tubes and the fibre guides that are eccentrically located inside these.

The function as well as the structure is so far the same as for an earlier known optical fibre connector described in AEU 29, 1975, pages 50–52, "A Simple Connector for Glass Fibre Optical Waveguides".

A helical spring 8 surrounds the jointing sleeve 5 and the jointing tubes 3 and 4 so that the latter are pressed into the V-shaped channel of the jointing sleeve 5. The helical spring 8 has opposite ends 9 and 10 bent outward and is surrounded by an outer tube 11 whose length is slightly less than the length of the helical spring 8. Tube 11 has at its opposite ends a number of radial cavities 12 and 13 for engagement with either one of the bent ends 9 and 10 of helical spring 8 to relax this through a rotary movement to thereby make possible an assembly or a disassembly of the jointing tubes 3 and 4 and the jointing sleeve 5.

The jointing sleeve 5 has one of its ends provided with a hexagon head 14 for engagement with a tool when relaxing the helical spring 8. In order to avoid the problem that repeated relaxing of the helical spring 8 will result in its becoming displaced laterally, the jointing sleeve 5 can preferably be provided with a cavity located below the V-shaped channel and arranged to constitute a fastener for a bent central turn of the helical spring 8.

The jointing tubes 3 and 4 have their facing ends provided with peripheral grooves 15 and 16 with oblique-angled walls nearest the ends and the jointing sleeve 5 is provided in a sidewall of the V-shaped channel with through holes for receiving balls 17 and 18 which engage with the grooves 15 and 16 under pressure through the helical spring 8. The distance between the grooves 15 and 16 is, when the ends of the jointing tubes are abutting, slightly greater than the distance between the holes for the balls 17 and 18 so that the ends of the jointing tubes will be pressed against each other by the helical spring 8.

According to the invention the glass capillaries 6 and 7 have end faces 19 and 20 bevelled at an angle of 45° at their ends opposite the joint ends for laterally projecting scattered light propagated from the joint. The jointing tubes 3 and 4 are provided with side windows 21 and 22 for tapping the laterally projected light. These bevelled end faces can suitably but not necessarily be provided with a mirror layer without which only a partial reflection is obtained.

The device according to the invention is specially suited for providing adjustable tapping of a slight amount of scattered light to produce a feed-back signal for level stabilization of an optical transmitter included in a fibre communication system and provided with an optical signal output and an optical control input for regulating the signal level of the signal output, for example as described in the U.S. Pat. No. 3,943,358. The signal input of the optical transmitter is connected to an outgoing optical fibre waveguide of the fibre communication system via an adjustable connector provided with a device according to the invention for tapping scattered light via a side window and the control input of the optical transmitter is connected to the side window.

Another application of the device according to the invention consists in adjusting, by means of a measuring instrument, the tapped amount of scattered light to a minimum corresponding to an accurately adjusted maximum of the coupling factor of the connector. Further applications of the invention are conceivable, for example, for providing adjustable taps along an optical distribution line.

We claim:

1. A device for controlling the concentricity of two cylindrical optical fibre waveguides in a joint in an adjustable connector comprising: a first cylindrical jointing tube for one of the fibre waveguides; a second cylindrical jointing tube for the other of the fibre waveguides; a jointing sleeve disposed about said jointing tubes and rotatably receiving the same; at least one capillary cylindrical tube of transparent material disposed about one of the fibre waveguides, said capillary tube having an oblique angled surface at the end thereof which is remote from the joint for laterally projecting scattered light propagated from the joint; and adjustable connector means connecting said jointing tubes in said jointing sleeve to permit relative rotation of said jointing tubes with respect to said sleeve for adjusting eccentricity of said fibre waveguides, the jointing tube surrounding said capillary tube being provided with a side window for accessing laterally projected light from said capillary tube to enable adjustment of the jointing tubes in said sleeve under the control of the laterally projected light.

2. A device as claimed in claim 1 wherein said adjustable connector means comprises resilient means biassing said jointing tubes in axially abutting relation in angularly positioned axially aligned relation.

3. A device as claimed in claim 2 wherein said adjustable connector means further comprises means for relaxing said resilient means to allow said jointing tubes to be relatively rotated in said sleeve.

4. A device as claimed in claim 2 wherein said jointing tubes have abutting ends provided with respective peripheral grooves, said jointing sleeve having holes facing said grooves, and balls in said holes acted on by said resilient means for engaging said grooves to press said ends of the jointing tubes together.

5. A device as claimed in claim 4 wherein said resilient means comprises a helical spring having opposite ends, said adjustable connector means further comprising an outer tube surrounding said helical spring and engaging one of the ends of the spring, the other end of the spring engaging said jointing sleeve.

6. In an optical fibre communication system including a transmitter having an optical signal output and an optical control signal input for regulating the signal level of the output apparatus comprising: a first optical fibre waveguide connected to the signal output of the transmitter; a second optical waveguide; and optical waveguide connecting means comprising a first cylindrical jointing tube disposed about said first optical fibre waveguide; a second cylindrical jointing tube disposed about said second optical fibre waveguide; a jointing sleeve disposed about said jointing tubes and rotatably receiving the same; a capillary cylindrical tube of transparent material disposed about said second optical fibre waveguide, adjustable connector means connecting said jointing tubes in said jointing sleeve to permit relative rotation of said jointing tubes for adjusting eccentricity of said fiber waveguides, the capillary tube having an oblique angled surface at the end which is remote from the joint for laterally projecting scattered light propagated from the joint; said jointing tube surrounding said capillary tube being provided with a side window for accessing laterally projected light; and means for coupling the laterally projected light to the optical control signal input of the transmitter.

7. The system of claim 6 wherein said adjustable connector means comprises resilient means biassing said jointing tubes in axially abutting relation in angularly positioned axially aligned relation.

8. The system of claim 8 wherein said adjustable connector means further comprises means for relaxing said resilient means to allow said jointing tubes to be relatively rotated in said sleeve.

* * * * *